(12) United States Patent
Ishihara et al.

(10) Patent No.: US 6,605,134 B2
(45) Date of Patent: Aug. 12, 2003

(54) METHOD AND APPARATUS FOR COLLECTING RARE GAS

(75) Inventors: Yoshio Ishihara, Tokyo (JP); Shigeru Hayashida, Tokyo (JP); Toru Nagasaka, Tokyo (JP); Tetsuya Kimijima, Tokyo (JP); Tadahiro Ohmi, Sendai (JP)

(73) Assignee: Nippon Sanso Corporation, Tokyo (JP)

( * ) Notice: Subject to any disclaimer, the term of this patent is extended or adjusted under 35 U.S.C. 154(b) by 0 days.

(21) Appl. No.: 09/953,480

(22) Filed: Sep. 14, 2001

(65) Prior Publication Data

US 2002/0035921 A1 Mar. 28, 2002

(30) Foreign Application Priority Data

Sep. 22, 2000 (JP) .................................. 2000-289102

(51) Int. Cl.[7] .......................... B01D 53/04; B01D 53/22
(52) U.S. Cl. .................. 95/45; 95/96; 96/9; 96/111; 96/130; 96/136
(58) Field of Search .................... 95/8, 11, 12, 45, 95/47, 51, 96, 127, 130; 96/4, 9, 111, 130, 134, 136

(56) References Cited

U.S. PATENT DOCUMENTS

| | | | |
|---|---|---|---|
| 4,701,187 A | 10/1987 | Choe et al. | |
| 4,717,407 A | 1/1988 | Choe et al. | |
| 4,861,361 A * | 8/1989 | Jain et al. | 95/51 X |
| 5,281,253 A * | 1/1994 | Thompson | 95/45 X |
| 5,282,969 A * | 2/1994 | Xu | 95/45 X |
| 5,378,263 A * | 1/1995 | Prasad | 95/45 X |
| 5,503,657 A * | 4/1996 | Bouard et al. | 95/45 |
| 5,632,803 A | 5/1997 | Stoner et al. | |
| 5,676,736 A * | 10/1997 | Crozel | 95/45 |
| 5,759,237 A * | 6/1998 | Li et al. | 95/47 X |
| 5,827,351 A * | 10/1998 | Prasad et al. | 96/9 X |
| 5,833,737 A * | 11/1998 | Tamura et al. | 95/127 X |
| 5,858,065 A * | 1/1999 | Li et al. | 95/45 |
| 5,928,415 A * | 7/1999 | Girard et al. | 96/4 |
| 5,976,222 A * | 11/1999 | Yang et al. | 95/45 |
| 6,168,649 B1 * | 1/2001 | Jensvold et al. | 96/9 X |
| 6,217,633 B1 * | 4/2001 | Ohmi et al. | 95/8 |
| 6,277,173 B1 * | 8/2001 | Sadakata et al. | 95/12 |
| 6,387,157 B1 * | 5/2002 | Yamashita | 95/45 |

FOREIGN PATENT DOCUMENTS

| | | |
|---|---|---|
| EP | 0 820 963 | 1/1998 |
| EP | 0 826 629 | 3/1998 |
| EP | 0 908 219 | 4/1999 |
| EP | 0 945 163 | 9/1999 |
| EP | 0 983 791 | 3/2000 |

OTHER PUBLICATIONS

European Search Report dated Oct. 17, 2002.

* cited by examiner

*Primary Examiner*—Robert H. Spitzer
(74) *Attorney, Agent, or Firm*—Merchant & Gould P.C.

(57) ABSTRACT

There is provided a method and an apparatus for collecting a rare gas, which are capable of effectively collecting the rare gas contained in an exhaust gas exhausted from a rare gas using apparatus such as a plasma apparatus or the like, and moreover capable of securely supplying the rare gas having a predetermined purity to the rare gas using apparatus, and the method for collecting rare gas which comprises collecting a rare gas contained in an exhaust gas exhausted from a rare gas using apparatus operated under decompression, the method comprises the step of collecting the rare gas by separating the rare gas and impurities contained in the exhaust gas via at least two gas separating steps.

6 Claims, 2 Drawing Sheets

METHOD AND APPARATUS FOR COLLECTING RARE GAS

BACKGROUND OF THE INVENTION

1. Field of the Invention

The present invention relates to a method and an apparatus for collecting a rare gas in particular, a method and an apparatus for collecting the (are gas contained in an exhaust gas exhausted from a rare gas using apparatus operated under decompression, such as a plasma sputtering apparatus, a plasma oxidation apparatus, a plasma CVD apparatus, a reactive ion etching apparatus or the like.

2. Description of the Prior Art

In a process for manufacturing a semiconductor device such as a semiconductor integrated circuit, an active matrix type liquid crystal panel, a solar cell and a panel thereof, a magnetic disk or the like, there has been used an apparatus such as a sputtering apparatus an oxidation apparatus, a plasma CVD apparatus, a reactive ion etching apparatus or the like for generating plasma in a rare gas atmosphere under decompression in order to carry out various processes for the semiconductor device by the plasma.

For example, in the sputtering apparatus, while introducing the rare gas into a process chamber with a flow rate of about 500 cc/minute, an inside of the chamber is exhausted by a vacuum exhaust apparatus, and a high frequency is applied to an electrode in the chamber in order to generate plasma in a state that a pressure of the chamber is maintained at about 1 Pa. Then, a solid film forming material provided in the chamber is sputtered by the plasma, to thereby form a thin film by deposition on a wafer surface.

Furthermore, in the oxidation apparatus, while introducing a mixed gas of the rate gas and oxygen into the process chamber with a flow rate of about 1000 cc/minute, plasma is generated in a state that a pressure of the chamber is maintained at about 100 Pa by the vacuum exhaust apparatus similar to the sputtering apparatus. Oxygen is made as a quasi-exited state by using the plasma. Oxide film is formed by the quasi-exited oxygen on the wafer surface which is heated to about 400° C.

Furthermore, in the plasma CVD apparatus) while introducing a mixed gas of a film forming gas and the rare gas into the process chamber with a flow rate of about 1000 cc/minute, plasma is generated in a state that a pressure of the chamber is maintained at about 100 Pa by the vacuum exhaust apparatus similar to the sputtering apparatus. The film forming gas is exited by using the plasma. The thin film is formed by deposition on the wafer surface which is heated to about 300° C.

Moreover, in the reactive ion etching apparatus, while introducing a mixed gas of an etching gas and the rare gas into the process chamber, plasma is generated in a state that a pressure of the chamber is maintained at several Pa. The etching gas is exited by using the plasma, to thereby carry out etching by using the exited ion.

In the above-described various apparatuses, since a process is carried out by using plasma having a high energy, if there exists in a processing atmosphere a gas such as nitrogen, oxygen, moisture or the like that does not contribute to film formation, there happen such problems that a predetermined thin film is not formed, or etching can not be carried out.

For example, in case of carrying out forming metallic interconnection for semiconductor integrated circuit by using the sputtering apparatus, if there exist moisture, oxygen or the like in the atmosphere, metallic film is oxidized, to thereby increase an electric resistivity of the metallic interconnection. Furthermore, there is even such a case that a crystal structure is changed similar to the case of tantalum. Moreover, if there exist oxygen, moisture, organic impurities or the like in the atmosphere where a polycrystalline silicon film is formed by the plasma CVD apparatus, there occur various problems.

In addition, if there exist impurities when etching is carried out by the reactive ion etching apparatus, a selectivity for materials can not be determined, to thereby cause inferior etching, or to damage a wafer. Therefore, the amount of the impurities contained in the rare gas introduced into the plasma using apparatus is necessarily to be reduced to a level of below several ppb.

FIG. 3 is a schematic diagram showing a sputtering apparatus as an embodiment of a plasma processing apparatus. Generally, this type of the sputtering apparatus is provided with a loading chamber 12 for conveying the wafer at the front of the process chamber 11, to thereby convey the wafer one by one.

The loading chamber 12 is maintained as decompressed state by a vacuum exhaust apparatus 13 connected to the loading chamber 12 via a valve, in a purge gas atmosphere of nitrogen gas or the like supplied from a purge gas supply device (not shown). After the loading chamber 12 and the process chamber 11 are vacuum-exhausted, the wafer before processing which is maintained in the loading chamber 12 is positioned on a wafer susceptor 15 in the process chamber 11 passing through a gate valve 14 for separating both the chambers 11,12.

After the gate valve 14 is closed, the rare gas which is supplied from a rare gas cylinder 16 and removed of impurities by a purifier 17, is introduced into the process chamber 11 via a gas supply apparatus 18. Generally in order to make an inside of the process chamber 11 as the rare gas atmosphere, a cycle comprising pumping the inside of the process chamber 11 by the vacuum exhaust apparatus 19 connected to the process chamber 11 and introducing the rare gas from the gas supply apparatus 18 is repeatedly carried out more than one time by an instruction from a control means.

After the inside of the process chamber 11 is made as the rare gas atmosphere, plasma is generated in the process chamber 11 by applying high frequency thereto from a high frequency electric source 21 via a matching circuit 20. Solid film forming material is sputtered by the generated plasma, to thereby deposit thin film on the wafer. The wafer formed with a predetermined thin film is conveyed from the process chamber 11 to the next process via the loading chamber 12 for next processing. In the above-described process, taking-in and taking-out of the wafer are carried out about 30 times per hour. In addition, nitrogen gas is introduced from nitrogen gas supply line 22 into the vacuum exhaust apparatus 19 for preventing back diffusion of the exhaust gas.

However, whether the exhaust gas vacuum exhausted from the sputtering apparatus via the vacuum exhaust apparatus is for purging the inside of the process chamber, or for being used in film formation, the exhaust gas is exhausted from an exhaust line 23 to an outside of a system as it is. On the other hand, the rare gas supplied from the rare gas supply cylinder 16 exists as a very small amount in the atmosphere, for example, the existence concentration of xenon is about 0.086 ppm in the atmosphere. The rare gas is manufactured by further purifying the rare gases concentrated in oxygen gas by cryogenic separation of the air, and is difficult to be obtained in a larger amount, and the cost thereof becomes higher in proportion to the existence ratio thereof.

Thus, it has been proposed a method for collecting the rare gas contained in the exhaust gas from the vacuum exhaust apparatus 19 by a closing loop. This method comprises compressing the exhaust gas by connecting the vacuum exhaust apparatus 19 and a compressor, providing a pair of switching valves in an outlet passage of the compressed gas, and opening and closing the switching valves according to the concentration of the rare gas, to thereby collect the exhaust gas from the process chamber with the rare gas collecting apparatus. The collected exhaust gas is removed of impurities in the appropriate purifier to be recycled.

However, since in this method nitrogen gas is introduced into the vacuum exhaust apparatus 19 for preventing back diffusion of the exhaust gas, it was difficult to collect the rare gas as having high concentration. Furthermore, even in case of collecting the rare gas as having some degree of high concentration, since nitrogen gas from the loading chamber 12 flows into the vacuum exhaust apparatus 19 passing through the process chamber 11 according to conveyance of a wafer, the concentration of the rare gas becomes fluctuated and it was difficult to optimize timing of the switching valve. In this result, there occur such problems that the absolute amount of the impurities becomes much, and the life span of the purifier becomes extremely shorter.

On the other hand, it is proposed a method for collecting the rare gas with high purity as it is, by providing a gas switching valve in an upstream of the vacuum exhaust apparatus 19. However, in this method, the switching valve needs to be changed once every several months due to a durability problem of the switching valve.

SUMMARY OF THE INVENTION

Therefore, the objective of the present invention is to provide a method and an apparatus for collecting a rare gas, which are capable of effectively collecting the rare gas contained in an exhaust gas exhausted from a rare gas using apparatus such as a plasma apparatus or the like using the rare gas under decompression, and further capable of reducing a consumption amount of the rare gas by stably supplying the rare gas having a predetermined purity to the rare gas using apparatus.

To achieve the above objective, according to the present invention, there is provide with a method for collecting rare gas which comprises collecting a rare gas contained in an exhaust gas exhausted from a rare gas using apparatus operated under decompression, the method comprising the step of collecting the rare gas by separating the rare gas and impurities contained in the exhaust gas via at least two gas separating steps. In particular, the gas separating step is any one of membrane separating step and adsorbing separating step, or combination step thereof, and preferably, the gas separating step is carried out by providing the adsorbing separating step at the rear of the membrane separating step.

In addition, according to the present invention, the gas separating step further comprises: a first separating step for equalizing concentration of the rare gas contained in the exhaust gas; a second separating step for concentrating the rare gas of which concentration is equalized; and a third separating step for removing impurities from the concentrated rare gas, and furthermore, the gas exhausted from the first separating step for equalizing concentration of the rare gas contained in the exhaust gas is returned to a vacuum exhaust apparatus for sucking up and exhausting the exhaust gas from the rare gas using apparatus.

Moreover, according to the present invention, there is provided an apparatus for collecting rare gas comprising: a rare gas using apparatus operated under decompression; a vacuum exhaust apparatus for sucking up an exhaust gas exhausted from the rare gas using apparatus; a gas separating apparatus for separating impurities contained in the exhaust gas exhausted from the vacuum exhaust apparatus by at least two gas separating means, collecting the rare gas of a predetermined concentration; a storage tank for storing the collected rare gas; impurity concentration detecting means for measuring a concentration of remaining impurities contained in the collected rare gas flowing our from the storage tank; a purifier for removing the remaining impurities contained in the collected rare gas, and purifying the rare gas; and a rare gas supply line for supplying the purified rare gas to the rare gas using apparatus.

In particular, according to the present invention, the gas separating apparatus comprises: a first compressor for compressing the exhaust gas exhausted from the vacuum exhaust apparatus; a first separating membrane for equalizing concentration of the rare gas contained in the compressed exhaust gas; a second separating membrane for concentrating the rare gas of which concentration is equalized in the first separating membrane; a second compressor for compressing the concentrated rare gas concentrated in the second separating membrane; an adsorbing separator for removing impurities contained in the concentrated rare gas compressed in the second compressor; a line for returning the exhaust gas from the second separating membrane on an upstream of the second separating membrane; and a line for returning the regenerating exhaust gas of the adsorbing separator to an upstream of the second separating membrane via the storage tank.

In addition, according to the present invention, the first separating membrane comprises a line for returning the exhaust gas to the vacuum exhaust apparatus. Furthermore, the impurity concentration detecting means opens an exhaust valve of the vacuum exhaust apparatus simultaneously with closing of an inlet valve of the purifier and a collecting valve of the gas separating apparatus when measured impurity concentration exceeds a predetermined upper limit, and commences supply of the rare gas from a rare gas supplementing line to the rare gas using apparatus. Moreover, the apparatus according to the present invention further comprises a line for returning the exhaust gas from the impurity concentration detecting means to an upstream of the vacuum exhaust apparatus or to an upstream of the gas separating apparatus.

BRIEF DESCRIPTION OF THE DRAWINGS

For fuller understanding of the nature and objects of the invention, reference should be made to the following detailed description taken in conjunction with the accompanying drawings in which.

DESCRIPTION OF THE PREFERRED EMBODIMENTS

Figure 1:
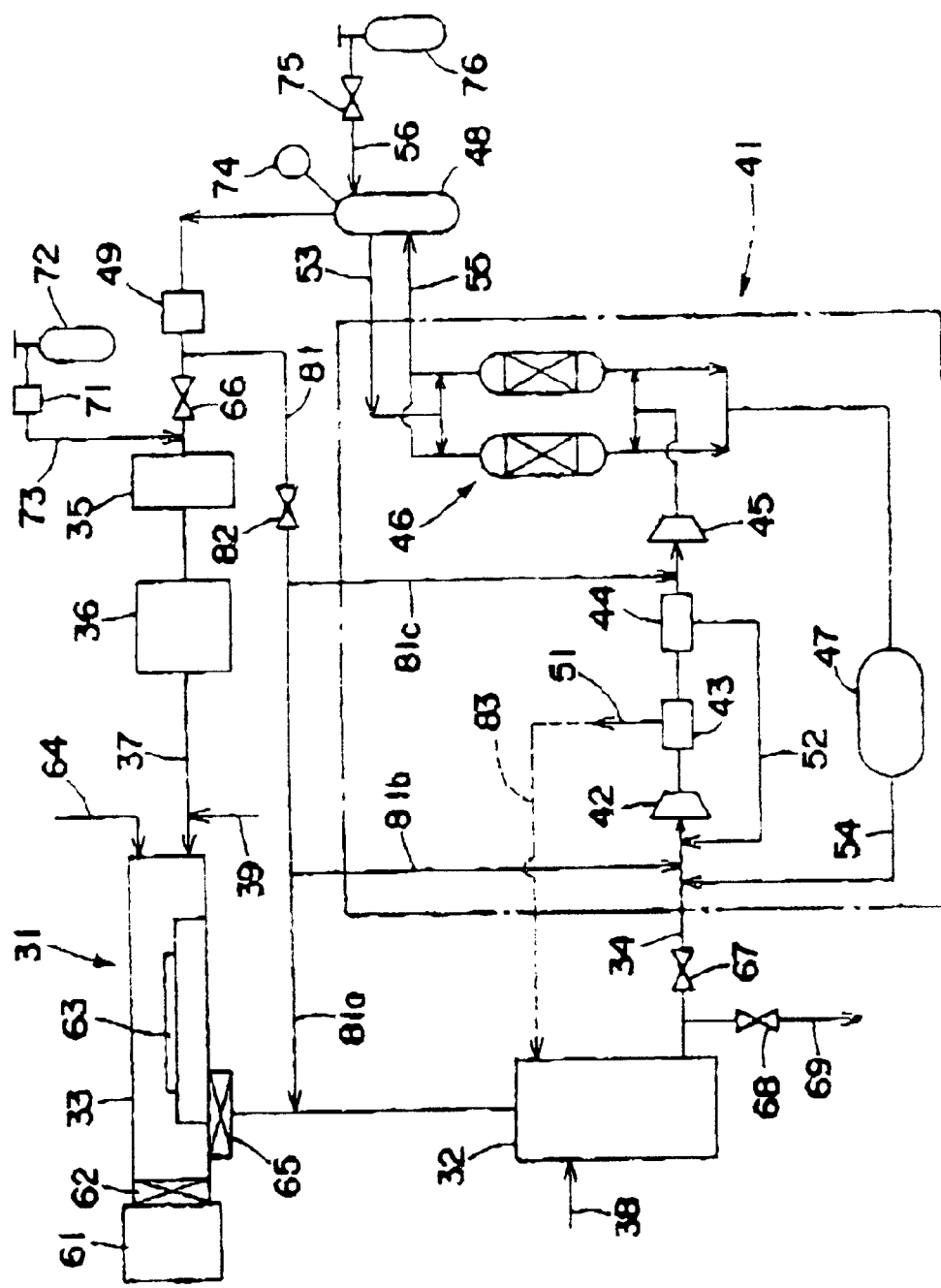
FIG. 1 is a systematic diagram showing an embodiment where a rare gas collecting apparatus according to the present invention is applied to a plasma oxidation apparatus as a rare gas using apparatus.

FIG. 1 is a systematic diagram showing an embodiment where a rare gas collecting apparatus according to the present invention is applied to a plasma oxidation apparatus as a rare gas using apparatus.

This rare gas collecting apparatus is formed as a closing loop where the rare gas contained in an exhaust gas exhausted from a vacuum exhaust apparatus 32 of a plasma oxidation apparatus 31 is separately collected to be purified, and then the purified rare gas is supplied to the plasma oxidation apparatus 31 again. The rare gas collecting apparatus is connected to the plasma oxidation apparatus 31 by an exhaust gas collecting line 34 for collecting the exhaust gas from the vacuum exhaust apparatus 32 for vacuum-exhausting a process chamber 33, and a rare gas supply line 37 for supplying the rare gas purified in a purifier 35 into the process chamber 33 via a gas supply apparatus 36.

Furthermore, the vacuum exhaust apparatus 32 is provided with a nitrogen supply line 38 for introducing nitrogen gas as a seal gas for preventing mixing of impurities from the atmosphere, and back diffusion of the exhaust gas. In addition, an introduction gas into the vacuum exhaust apparatus 32 is preferably the one tat does not affect manufacturing processes and thus, is not limited to nitrogen gas. Moreover, a pump used in the vacuum exhaust apparatus 32 is preferably the one that does not use oil. A turbo-molecular pump, a dry pump, a screw pump or a combined one thereof can be appropriately used.

A downstream of the exhaust gas collecting line 34 is provided with a gas separating apparatus 41. The gas separating apparatus 41 comprises a first compressor 42 for compressing the exhaust gas from the vacuum exhaust apparatus 32 to a predetermined pressure, a first separating membrane 43 which is a gas separating means for carrying out a first separating step for equalizing a concentration of the rare gas contained in the compressed exhaust gas, a second separating membrane 44 which is a gas separating means for carrying out a second separating step for concentrating the rare gas of which concentration is equalized in the first separating membrane 43, a second compressor 45 for compressing the concentrated rare gas concentrated in the second separating membrane 44 to a predetermined pressure, an adsorbing separator 46 which is a gas separating means for carrying out a third separating step for removing impurities contained in the concentrated rare gas compressed in the second compressor 45, a second storage tank 47 for temporarily storing the exhaust gas regenerated in the adsorbing separator 46, an exhaust line 51 for exhausting the exhaust gas from the first separating membrane 43 to the outside of the system, an exhaust gas returning line 52 for returning the exhaust gas from the second separating membrane 44 to an upstream of the first compressor 42, a regenerating gas returning line 53 for returning the rare gas for regenerating the adsorbing separator 46, and a regenerating exhaust gas returning line 54 for returning the regenerating exhaust gas of the adsorbing separator 46 to an upstream of the first compressor 42 via the second storage tank 47

A downstream of the gas separating apparatus 41 is connected to the purifier 35 from a rare gas flowing-out line 55 through which the rare gas processed in the adsorbing separator 46 flows; via a first storage tank 48 and a monitor 49 as an impurity detecting means.

In addition, a step number of the first, second separating membranes 43,44 can be appropriately determined according to an efficiency (separation factor) of the separating membrane to be used. For example, in case of separating membrane of which the separation factor of the rare gas and impurities is about 5, the separating membrane is preferably more than one step. Material of the separating membrane is preferably the one that does not react with a gas to be used. For example, inorganic material, such as ceramic or the like, can be preferably used.

Furthermore, by making the tower number of the adsorbing separator 46 more than two to allow switchable using thereof, it is possible to continuously separate impurities from the rare gas. Moreover, the number of the first, second compressors 42, 45 can be appropriately determined according to the efficiency of the respective separating membranes 43,44 or the required pressure of the adsorbing separator 46. However, in order to prevent the atmospheric components into the system, a bellows type of a compressor can be preferably used.

In the present embodiment, for the purpose of stabilizing a concentration or a flow rate of the rare gas, the regenerating exhaust gas of the adsorbing separator 46, is made to flow back to the exhaust gas collecting line 34 via the second storage tank 47. However, if the concentration of the rare gas in the upstream of the first compressor 42 is uniform to some degree, the second storage tank 47 can be omitted. Furthermore, the exhaust line 51 from the first separating membrane 43 can be provided with a vacuum pump as occasion demands. Moreover, the exhaust gas collecting line 34 can be provided with a removing apparatus (such as filter) for removing metallic particles contained in the exhaust gas as occasion demands.

In addition, when the rare gas using apparatus is the apparatus using toxic component such as a reactive gas or the like, for example, a plasma CVD apparatus, a reactive ion etching apparatus or the like, since it is necessary to carry out a process for detoxicating such toxic component contained the exhaust gas, a detoxicating apparatus using detoxicant (such as reactant, adsorbent or the like) is provided in addition to the removing apparatus. The detoxicating apparatus can be formed separately either from the detoxicating device or the rare gas collecting apparatus, or can be formed integrally with the detoxicating device.

In addition, in the present embodiment, explained is the rare gas collecting apparatus comprising a separatingly collecting means such constructed that after the concentration of the rare gas is reduced to about 90% by using the first separating membrane and the second separating membrane, the impurities are removed from the concentrated rare gas by using the adsorbing separator. However, the present invention is not limited to this. The present invention can be also applied to the rare gas collecting apparatus comprising such constructions that after the rare gas is concentrated by at least one adsorbing separator instead of the separating membrane, the impurities are removed from the concentrated rare gas by using the separating membrane instead of the adsorbing separator according to the present invention.

Moreover, it is possible to carry out from concentrating operation of the rare gas to removing impurities by more than two separating membranes altogether, and also possible to carry out from concentrating to removing impurities by more than two adsorbing separators.

Hereinafter, the method according to the present invention is described based on the sequence of collecting and then resupplying the rare gas. At first, when a pressure of a loading chamber 61 becomes equal to that of the process chamber 33, and a gate valve 62 separating both the chambers 33,61 is opened, a wafer in a loading chamber 61 before processing is positioned on a wafer susceptor 63 in the process chamber 33 passing through the gate valve 62.

At this time, in order to prevent reverse diffusion of the impurities from the vacuum exhaust system, the inside of the process chamber 33 is ventilated by a purge gas from a purge gas supply line 64, and then is maintained in a decompression state with being ventilated by the purge gas. As the purge gas, nitrogen gas is commonly used, however, a type of the purge gas can be preferably selected according to a process, and even a gas other than nitrogen gas is usable. Furthermore, the wafer susceptor 63 is heated to a required temperature, for example, to about 400° C. according to a process.

After the gate valve 62 for separating both the chambers 33, 61 is closed, gas molecules in the process chamber 33 are exhausted by the vacuum exhaust apparatus 32 connected to the process chamber 33 via the valve 65. In succession, the rare gas which is removed of impurities by the purifier 35 is introduced into the process chamber 33 at a flow rate of about 1000 cc per minute from the gas supply apparatus 36 via the rare gas supply line 37 and after the inside of the process chamber 33 is made as the rare gas atmosphere, high frequency is applied from a high frequency electric source thereto, to thereby generate plasma by a high frequency electric discharge. Pressure during generating the plasma is generally 1 Pa.

After generating the plasma, the rare gas having about 3% of oxygen concentration is introduced from the oxygen supply line 39, and oxygen radical is generated by the produced plasma, thereby oxide film is formed on the wafer by the oxygen radical. The wafer formed with a predetermined oxide film is conveyed to the next process from the process chamber 33 via the loading chamber 61 for next processing. At this time, a mixed gas of the rare gas and oxygen used in oxidization is forcibly exhausted from the process chamber 33 by the purge gas. In the process thus described above, taking in and taking out of the wafer are carried out about twenty times per hour.

On the other hand, the exhaust gas from the process chamber 33 is vacuum-exhausted via the valve 65 separating the process chamber 33 and the vacuum exhaust apparatus 32, to thereby be introduced into the rare gas collecting apparatus. In this case, the removing apparatus (such as filter) mainly aiming to remove metallic particles is not necessarily required. However, as described above, in case of adopting a bellows type for the compressors 42, 45, a particle removing apparatus which is constructed by centering around metallic filter or the like in order to protect the bellows, is preferably provided.

Furthermore, as described above, in case of carrying out a process for detoxicating the toxic component contained in the exhaust gas, it is preferred to provide a detoxicating apparatus which is constructed by centering around the detoxicant for detoxicating reactive gas molecules by oxidization reaction or the adsorbent for adsorbing and removing them. As the detoxicant, copper oxide, steel oxide, nickel oxide, platinum or a compound thereof or the like can be appropriately used, while as the adsorbent, activated carbon, alumina, zeolite or the like can be used. However, it is not limited to these. In addition, in case that the reactive gas molecules are compound having high boiling point (more than 50° C. of boiling point), it is possible to remove the reactive gas molecules through liquefying or solidifying them by providing a cooling tower.

The exhaust gas introduced into the gas separating apparatus 41 from the vacuum exhaust apparatus 32 through the exhaust gas collecting line 34 is introduced into the first compressor 42 to be pressurized to a predetermined pressure, for example, to about 0.2 MPa. Though the first compressor 42 can utilize a common bellows type, it is not limited to this. The compressed exhaust gas is introduced into the first separating membrane 43 such that the impurities contained in the exhaust gas, such as, oxygen nitrogen or the like are separated to be removed to some degree and at the same time, equalization of the rare gas concentration is carried out.

At this time, the rare gas component is contained to some degree in the impurity gas exhausted to the outside of the system from the exhaust line 51. In succession, the impurity gas is introduced into the second separating membrane 44 such that the rare gas component is concentrated. At this time, since the rare gas is contained in a large amount, for example, about 50% in the impurity component separated in the second separating membrane 44, it is possible to return this impurity gas from the exhaust gas returning line 52 to the upstream of the first compressor 42, to thereby collect the rare gas. Moreover, in order to make the exhaust pressure from the first compressor 42 to be constant, it is necessary to provide a circulation line connected to the front and the rear of the first compressor 42 via a valve. However, it is also possible to use the exhaust gas returning line 52 from the second separating membrane 44 as the circulation line.

The concentrated rare gas (the concentration of the rare gas: about 90%) concentrated in the second separating membrane 44 is introduced into the second compressor 45 to be pressurized to a predetermined pressure and then, is introduced into the adsorbing separator 46. The adsorbing separator 46 is made to have a type, for example, a pressure swing type, where two towers are alternately switchably operated by a switching valve, such that it is possible to continuously remove the impurities from the concentrated rare gas. In addition, the tower number is not limited to two towers, but it is possible to provide more than two towers according to design requirements such as impurity concentration, adsorption length or the like. The rare gas, which the impurities contained therein are almost adsorbed and removed in the adsorbing separator 46 until the impurities are removed to be a very small amount, is temporarily stored in the first storage tank 48 via the rare gas flowing-out line 55.

On the other hand, when the impurities are adsorbed in the adsorbent more than a predetermined amount, regeneration of the adsorbent is carried out. In the regeneration, after an inner gas of the adsorbing separator 46 is exhausted from an inlet side of the adsorbing separator 46 to the atmosphere, the impurities adsorbed in the adsorbent are separated by ventilating the rare gas from an outlet side of the adsorbing separator 46. At this time, the rare gas is introduced into the adsorbing separator passing through a regenerating gas returning line 53 from the first storage tank 48. However, the ventilating rare gas is not necessarily taken out from the first storage tank 48 and thus, may be taken out either from the rare gas flowing-out line 55 connected to the adsorbing comparator 46 and the first storage tank 48 via a valve, or from a rare gas supplementing line 56 for supplementing the rare gas to the first storage tank 48.

After finishing a process for separating impurities, the inlet side of the adsorbing separator 46 is closed, and the rare gas is filled into the adsorbing separator 46 with a some degree of pressure, to thereby finish the regeneration In addition, switching of the adsorption and the regeneration in the adsorbing separator 46 is commonly carried out with about three minutes of time interval, however, it can be carried out with more than three minutes.

The concentration of the rare gas stored in the first storage tank 48 is measured by the monitor 49 which is an impurity detecting means. At this time, since the monitor 49 measures the impurity component contained in the rare gas which is continuously collected and then re-supplied, a type of method for carrying out in-situ measuring is preferable in order to increase collecting rate of the rare gas.

The monitor 49 can utilize various types of equipment if they are capable of the in-situ measuring. For example, an equipment such as FT-IR, a photoacoustic measuring instrument, a spectroscopic analyzer using a laser as a light source, an emission spectrochemical analyzer, a thermal conductivity detector, an equipment measuring an electric discharge current or a voltage in the atmospheric electric discharge, zirconia-type oxygen sensor or the like, which are highly sensitive and does not contaminate gas in measuring, are appropriate. Thus, since there becomes no such occasion that the rare gas is unnecessarily exhausted to the outside of the system and moreover it is enough to merely provide a port in piping for attachment, the cheaper-cost measurement becomes available.

Figure 2:
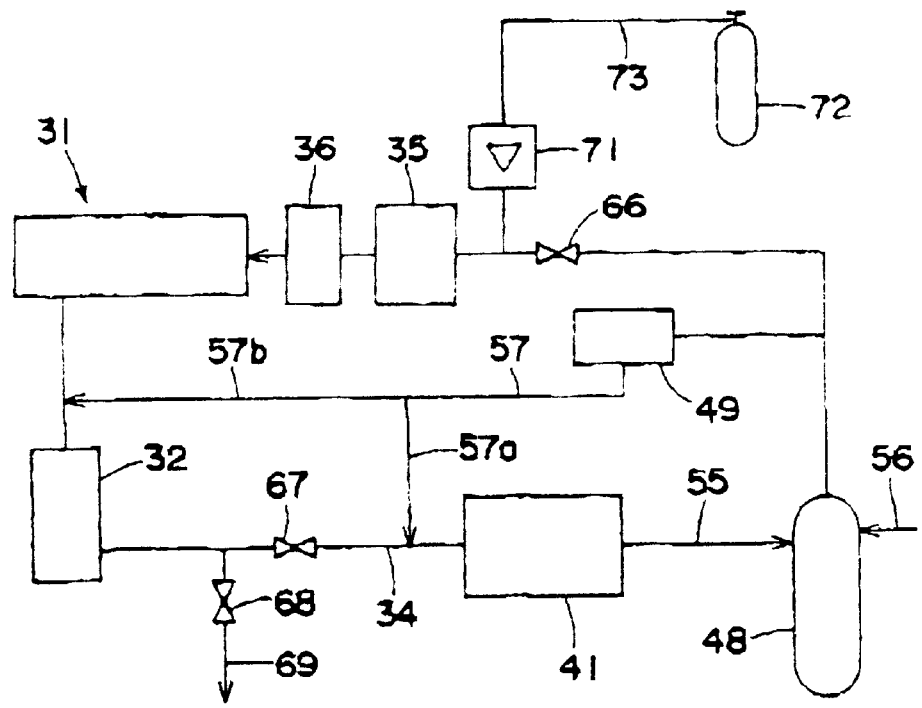
FIG. 2 is a schematically systematic diagram showing another embodiment of the rare gas collecting apparatus.
Figure 3:
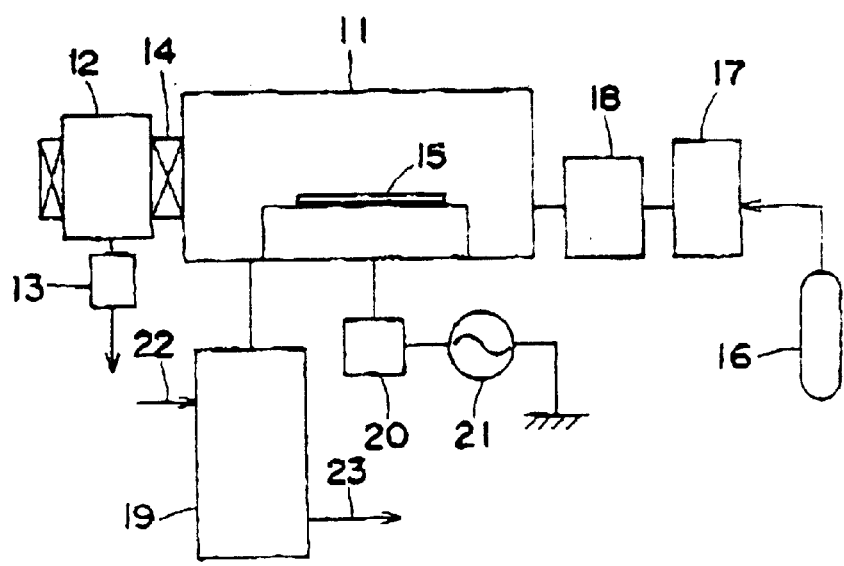
FIG. 3 is systematic diagram showing a sputtering apparatus as an example of a plasma processing apparatus.

Furthermore, the monitor of the above-mentioned respective methods can be combined with a gas chromatograph for achieving hyper-sensitivity or increasing stability of the measurement, or can be made a type where a gas having different component is added. In addition, it is possible to utilize a mass spectrometer. However, in case of these methods, that is to say, in case where the analyzed exhaust gas is exhausted from the monitor 49 and it is not the in-situ analysis, in order to effectively collect the rare gas contained in the analyzed exhaust gas exhausted from the monitor 49, for example, as shown in FIG. 2, it is preferred to return the analyzed exhaust gas by providing an analyzed exhaust gas returning line 57 comprising a line 57*a* connected between the vacuum exhaust apparatus 32 and the gas separating apparatus 41, or a line 57*b* connected between the process chamber 33 and the vacuum exhaust apparatus 32.

In particular, in case of a type where the analyzed exhaust gas is vacuum-exhausted, it is effective to make the vacuum exhaust apparatus 32 for the rare gas using apparatus as a common use in order for simplification of the apparatus As the gas having different component to be added in this case, the gas which is easily separated in the gas separating apparatus 41 is preferred. For example, helium or argon can be exemplified. Furthermore, in the present embodiment, the monitor 49 is provided between the first storage tank 48 and the purifier 35. However, it can be provided in the upstream of the first storage tank 48. Moreover, the rare gas supplementing line 56 can be provided between the first storage tank 48 and the purifier 35. The monitor 49 of such case is preferably provided between the first storage tank 48 and the rare gas supplementing line 56.

By the monitor 49, measured is the concentration of at least one component among the impurities such as oxygen, nitrogen, moisture, carbon monoxide, carbon dioxide, carbon fluoride, hydrogen, various film forming gases or the like, which are not removed in the gas separating apparatus 41 and remain in a very small amount in the rare gas, and then a measured signal is transferred to a control means. In case of using, for example, a getter-type purifier as the purifier 35, if impurities are introduced into the getter-type purifier more than a predetermined concentration, generally more than 1,000 ppm, since a violent heat generation is occurred to cause a convergence reaction, controlling the impurity concentration by the monitor 49 is important for securing the safety of the getter-type purifier if. It is identified by the monitor 49 that the impurity concentration becomes, for example, less than 100 ppm, preferably less than 10 ppm, the inlet valve 66 of the purifier provided in the downstream of the monitor 49 is opened such that the rare gas is introduced into the purifier.

If the impurity concentration exceeds an allowable upper-limit, the inlet valve 66 of the purifier and a collecting valve 67 provided in the exhaust gas collecting line 34 corresponding to the inlet of the gas separating apparatus 41 are closed by the signal from the monitor 49 via the control means such that flowing-in of the gas from the gas separating apparatus 41 to the purifier 35 is cut off, while an exhaust valve 68 of the vacuum exhaust apparatus 32 is opened such that the exhaust gas from the vacuum exhaust apparatus 32 is exhausted from an exhaust line 69 to the outside of the system of the rare gas collecting apparatus through the exhaust valve 68. Moreover the rare gas stored in a high pressure cylinder 72 or the like is supplied to the purifier 35 through the rare gas supply line 73 by a flow rate controller 71 such that the rare gas is supplied from the gas supply apparatus 36 to the process chamber 33 through the rare gas supply line 37, thereby the plasma oxidation apparatus continues to operate. In addition, it is possible to make the system smaller by using two-connected three-way valve for the valves 67,68.

Furthermore, if the measurement value of a pressure gauge 74 provided in the first storage tank 48 becomes below a predetermined pressure the rare gas stored in the high pressure cylinder 76 or the like is supplemented from the rare gas supplementing line 56 via a rare gas supplementing valve 75. The supplement of the rare gas by the indication from the pressure gauge 74 can be carried out from the high pressure cylinder 72 through the flow rate controller 71 and the rare gas supply line 73. In such a case, the rare gas supplementing line 56 can be omitted.

Moreover, by providing a reprocessed gas circulation line 81 comprising a line 81*a* from the downstream of the monitor 49 to the upstream of the vacuum exhaust apparatus 32, a line 81*b* to the upstream of the first compressor 42 therefrom and a line 81*c* reaching to the upstream of the second compressor 45 therefrom, it is possible to re-introduce even the rare gas having high impurity concentration into the gas separating apparatus 41 without exhausting the rare gas to the outside of the system, to thereby carry out reprocessing thereof. Furthermore, the line 81 is provided with a valve 82 and at the same time, a pump can be provided as occasion demands.

Furthermore, it is preferable to set up a piping capacity and a gas flow rate from the monitor 49 to the inlet valve 66 such that the high concentration impurities can not reach to the purifier 35 during a time interval from sending an abnormal signal from the monitor 49 to finishing a closing operation of the inlet valve 66. In order to increase the piping capacity, it is preferable to provide for example, a buffer tank at the front of the inlet valve 66.

In the purifier 35, the impurities or the like contained in the rare gas are removed. Various types, for example, adsorption type or membrane separating type can be used in the purifier 35. However, a getter-type purifier using metal, such as titanium, vanadium, zirconium, iron, nickel, or alloy is appropriate. Since the impurity concentration in the rare gas is measured by the monitor 49, the rare gas of which impurity concentration has been already known is introduced into the purifier 35. Generally, since a performance (impurity removing efficiency) of the getter-type purifier depends on the inlet impurity concentration and a superficial velocity, it is possible to carry out an optimum design according to a required flow rate. Moreover, it is possible to calculate a life span of the getter by providing an integrating flowmeter in the purifier 35, to thereby predict a changing time of the getter.

The rare gas of which impurities are removed in the purifier 35 is introduced from the rare gas supply apparatus 36 to the process chamber 33 via the rare gas supply line 37, to thereby be recycled. Thus, according to the present embodiment, since most of the rare gas used in the plasma oxidation apparatus 31 can be collected to be recycled, it is possible to use the required rare gas with a required purity as well as a cheaper cost.

Furthermore, it is possible to provide a seal gas introduction line 83 for using the gas as a seal gas of the vacuum exhaust apparatus 32, by introducing the gas exhausted from the first separating membrane 43 to the exhaust line 51. Thus, it is possible to return the rare gas contained in the gas exhausted from the exhaust line 51 to the inside of the system again.

That is to say, since the seal gas of the vacuum exhaust apparatus 32 is introduced in order to prevent leak from an axial portion of a rotator provided for rotating a screw portion which is a major part of the vacuum pump, approximately half of the seal gas is exhausted into the atmosphere However, the unexhausted steel gas is mixed into the vacuum pump second side from the axial portion, to thereby be introduced into the inside of the system. Therefore, by introducing the exhaust gas from the first separating membrane 43 to the vacuum exhaust apparatus 32 via the seal gas introduction line 83 for using the exhaust gas as the seal gas, it is possible to reduce the amount of the rare gas exhausted together with the exhaust gas to the outside of the system by about half, to thereby improve the rare gas collecting rate.

Moreover, since the rare gas, in particular, krypton or xenon has a high viscosity, in case of using the exhaust gas from the first separating membrane 43 as the seal gas of the vacuum exhaust apparatus 32 as described above, it is possible to reduce the required amount thereof. That is to say, it is possible to secure enough seal performance even with smaller flow rate by using the exhaust gas from the first separating membrane 43 as the seal gas. In result, it is possible to reduce or dispense with the amount of sealing nitrogen gas which is to be separately introduced. In addition, since it is possible to reduce the amount of the sealing nitrogen gas mixed into the inside of the system, the respective equipment of the rare gas collecting apparatus, for example, the separating membrane, the compressor, the adsorbing separator or the like, can be made smaller, thereby a smaller size and a cheaper cost of the rare gas collecting apparatus can be achieved.

In addition, the flow rate of nitrogen gas to be introduced as the seal gas can be preferably decided according to a design of the axial seal portion or an allowable mixed amount of the atmosphere. However, in case that the amount of the exhaust gas from the first separating membrane 43 is smaller, it is possible to further improve the rare gas collecting rate by dividing the seal gas introduction portion into more than two portions, and then by introducing the exhaust gas from the separating membrane 43 into a side to be mixed into the inside of the system, and introducing nitrogen gas into a side to be exhausted the outside of the system.

Furthermore, in case of connecting the rare gas collecting apparatus into the rare gas using apparatus similar to the plasma oxidation apparatus 31 to introduce nitrogen gas and a gas other than the rare gas therein, it is preferred to separately provide a removing apparatus for removing nitrogen gas and the gas component other than the rare gas, between the exhaust line 51 of the first separating membrane 43 and the vacuum exhaust apparatus 32.

That is to say, in case of the plasma oxidation apparatus 31, since the gas exhausted from the first separating membrane 43 contains the rare gas as well as nitrogen gas and oxygen gas, in order to remove oxygen gas, for example, it is preferable to use the exhaust gas as the seal gas after providing an oxidation removing apparatus combined with the getter and the adsorbent in the exhaust line 51 to remove oxygen gas. Furthermore, in case of the reactive etching apparatus using toxic components, the plasma CVD apparatus or the like, as describe above, it is preferable to remove the toxic components in advance, by separately providing the detoxicating apparatus for the toxic components.

As described above, the exhaust gas exhausted from the rare gas using apparatus, such as the plasma oxidation apparatus 31, via the vacuum exhaust apparatus 32, is introduced into the adsorbing separator 46 for carrying out adsorbing and removing impurities in such a state that the concentration is equalized (stabilized) with roughly separating the impurities to make the concentration of the rare gas become between 30% and 50% in the first separating membrane 43, and that the impurities are further removed for concentrating the rare gas to make the concentration of the rare gas become about 90% in the second separating membrane 44, thus it is possible to reduce a load of the adsorbing separator 46 to improve the separating efficiency of the impurities.

Thus, it is possible to securely carry out purifying process in the purifier 35 in a stable state by further purifying the rare gas which is removed of impurities in the adsorbing separator 46 to a very small amount, in the purifier 35. That is to say, by removing most of impurities in the adsorbing separator after carrying out rough separating (concentration-stabilizing and concentrating) in the separating membrane, it is possible to make use of characteristics of the membrane separation and the adsorbing separation which are the gas separating means to thereby collect the rare gas with good efficiency.

Furthermore, though the present embodiment shows an example where one rare gas using apparatus is connected to one rare gas collecting apparatus, it is also possible to connect a plurality of the rare gas using apparatus to one rare gas collecting apparatus. For example, three rare gas using apparatus are connected to one rare gas collecting apparatus and thus, it is possible to equalize the flow rate and concentration of the exhaust gas introduced into the rare gas collecting apparatus, by shifting an exhaust peak (a process starting time) of the rare gas not to be overlapped. Thus, a safe operation of the gas separating apparatus 41 becomes possible and at the same time, it is possible to equalize the amount of the rare gas supplied from the purifier 35 via the rare gas supply apparatus 36.

Furthermore, in the gas separating means, it is possible to use any means according to a condition of the exhaust gas composition or the like. For example, it is possible to separate impurities with such a method as, to use reactant, to use heated metal or to generate plasma. Moreover, the rare gas to be collected can be not only a case of solely using any one of helium, neon, argon, krypton or xenon, but also a case of mixingly using more than two of those.

EXAMPLES

Example 1

An operation for collecting krypton gas contained in the exhaust gas was carried out by using the rare gas collecting apparatus having constructions shown in FIG. 1 for the sputtering apparatus as the rare gas using apparatus, and then the collecting rate was measured. The collecting rate of the krypton gas was calculated from a used flow rate measured in a mass flowmeter provided in the gas supply apparatus, and a newly introduced amount measured in a flowmeter provided in the supplementing line of the first storage tank.

In the sputtering apparatus, aluminum was used as the film forming solid material. Furthermore, a gate valve for separating the process chamber and the loading chamber is opened and closed only when the wafer is taken in and out. The time of taking-in and taking-out of the wafer was 30 seconds. Nitrogen gas as the purge gas was respectively introduced into the loading chamber and the process chamber before carrying out taking-in and taking-out of the wafer. The pressure thereof was made to be 1 Pa. After the wafer was provided in the process chamber, the krypton gas was introduced with a flow rate of 1000 cc/minute for 10 seconds to carry out preparatory exhaust.

Thereafter, with flowing the krypton gas with a flow rate of 1000 cc/minute at a pressure of 1 Pa, film formation was carried out for 1 minute by generating plasma. This process was repeatedly carried out, and 6-inch wafer fleas processed with a speed of 36 sheets/hour. Electric resistivity of aluminum thin, film obtained in this experiment was almost same with that Of solid material. Furthermore, electric resistivity between wafers to wafers were almost constant In addition, the total introduction amount of the krypton gas to the process chamber at this time was about 42L, and the total amount of newly introduced krypton gas was 16.8L per hour. From the above result, it was understood that the collecting rate was about 60%.

Experiment 2

In the rare gas collecting apparatus having constructions shown in FIG. 1, the seal gas introduction line 83 was provided in the exhaust line 51, and the exhaust gas of the first separating membrane 43 was used as the seal gas of the vacuum exhaust apparatus 32. Other conditions were the same as the example 1. In result, the total introduction amount of the krypton gas to the process chamber was about 42L, and the total amount of newly introduced krypton gas was about 8L. Therefore, the collecting rate becomes about 80%.

Experiment 3

In the plasma oxidation apparatus, the rare gas collecting apparatus having the same constructions as the examples 2, the collecting rate was measured by carrying out the operation for collecting krypton gas. Furthermore, an oxygen gas removing apparatus was provided in the seal gas introduction line. 6-inch silicon wafer was used as the wafer, and a wafer temperature was 400° C. The gate valve for separating the process chamber and the loading chamber was opened and closed only when the wafer was taken in and out. The time of taking-in and taking-out of the wafer was 25 seconds. Nitrogen gas was introduced into the loading chamber and the process chamber before taking-in and out of the wafer. The pressure thereof was made to be 100 Pa. After the wafer was provided in the process chamber, the krypton gas where oxygen gas concentration was modulated to 3% was introduced with a flow rate of 1000 cc/minute for 10 seconds to carry out the preparatory exhaust.

Thereafter, with flowing the krypton gas where oxygen gas concentration was modulated to 3%, with a flow rate of 1000 cc/minute at a pressure of 100 Pa, oxidizing process was carried out for 25 seconds by generating plasma. Wafer was processed with a speed of 30 sheets/minute by repeatedly carrying out this process. In the present embodiment, MOS capacitor was manufactured for evaluating the formed oxide film. The thickness of the oxide film formed by the oxidation process for 25 seconds was about 7 nm. Furthermore, when the ratio of silicon (Si) and oxygen (O) was analyzed, the ratio was approximately equal to theoretical ratio. A density of bulk charge in the oxide film was also equal to that of thermal oxidation film. These results were obtained even when the collected rare gas was used, and were approximately constant value between the 30 sheets of the wafer.

In the present embodiment, the total introduction amount of the krypton gas to the process chamber was about 34L, and the total amount of newly introduced krypton gas was 5L. Therefore, the collecting rate becomes about 85%.

As described above, according to the present invention, it is possible to collect the rare gas contained in the exhaust gas exhausted from the rare gas using apparatus such as the plasma processing apparatus or the like with high efficiency, and also it is possible to recycle the required rare gas with a required purity as well as a cheaper cost. Furthermore, since separating process is carried out in a state where the concentration of the rare gas contained in the collected exhaust gas is maintained approximately constant, it is possible to make optimization of the separating process easier, and to carry out safer operation. Moreover, since it is possible to use the exhaust gas from the separating membrane as a seal gas of the vacuum exhaust apparatus, it is possible to reduce the amount of the seal gas to further improve the collecting rate, thereby it is possible to achieve a smaller size and a cheaper cost of the rare gas collecting apparatus.

What is claimed is:

1. A method for collecting rare gas which comprises collecting a rare gas contained in an exhaust gas exhausted from a rare gas using apparatus operated under decompression, the method comprising the step of:
   collecting said rare gas by separating said rare gas and impurities contained in said exhaust gas via at least two gas separating steps, wherein said gas separating steps comprise:
   a first separating step for equalizing concentration of said rare gas contained in said exhaust gas;
   a second separating step for concentrating said rare gas of which concentration is equalized to obtain a concentrated rare gas; and
   a third separating step for removing impurities from said concentrated rare gas.

2. The method of claim 1, wherein gas exhausted from said first separating step for equalizing concentration of said rare gas contained in said exhaust gas is returned to a vacuum exhaust apparatus for sucking up and exhausting said exhaust gas from said rare gas using apparatus.

3. An apparatus for collecting rare gas comprising:
   a rare gas using apparatus operated under decompression;
   a vacuum exhaust apparatus for sucking up an exhaust gas exhausted from said rare gas using apparatus;
   a gas separating apparatus for separating impurities contained in said exhaust gas exhausted from said vacuum exhaust apparatus by at least two gas separating means and collecting a rare gas of a predetermined concentration;
   a storage tank for storing said rare gas collected;
   impurity concentration detecting means for measuring a concentration of remaining impurities contained in said rare gas flowing out from said storage tank;

a purifier for removing said remaining impurities contained in said rare gas to obtain a purified rare gas; and a rare gas supply line for supplying said purified rare gas to said rare gas using apparatus, wherein said gas separating apparatus comprises:

a first compressor for compressing said exhaust gas exhausted from said vacuum exhaust apparatus to obtain a compressed exhaust gas;

a first separating membrane for equalizing concentration of said rare gas contained in said compressed exhaust gas;

a second separating membrane for concentrating said rare gas to obtain a concentrated rare gas of which concentration is equalized in said first separating membrane;

a second compressor for compressing said concentrated rare gas concentrated in said second separating membrane;

an adsorbing separator for removing impurities contained in said concentrated rare gas compressed in said second compressor;

a line for returning said exhaust gas from said second separating membrane to an upstream of said second separating membrane; and a line for returning a regenerating exhaust gas of said adsorbing separator to an upstream of said second separating membrane via said storage tank.

4. The apparatus of claim 3, wherein said first separating membrane comprises a line for returning said exhaust gas to said vacuum exhaust apparatus.

5. The apparatus of claim 3, wherein said impurity concentration detecting means opens an exhaust valve of said vacuum exhaust apparatus simultaneously with closing of an inlet valve of said purifier and a collecting valve of said gas separating apparatus when measured impurity concentration exceeds a predetermined upper limit, and commences supply of said rare gas from a rare gas supplementing line to said rare gas using apparatus.

6. The apparatus of claim 3, further comprising a line for returning said exhaust gas from said impurity concentration detecting means to an upstream of said vacuum exhaust apparatus or to an upstream of said gas separating apparatus.

* * * * *